June 9, 1925. 1,541,007
W. H. THIEMER
SLIP END SPLINE CONNECTION FOR UNIVERSAL JOINTS AND THE LIKE
Filed July 18, 1921
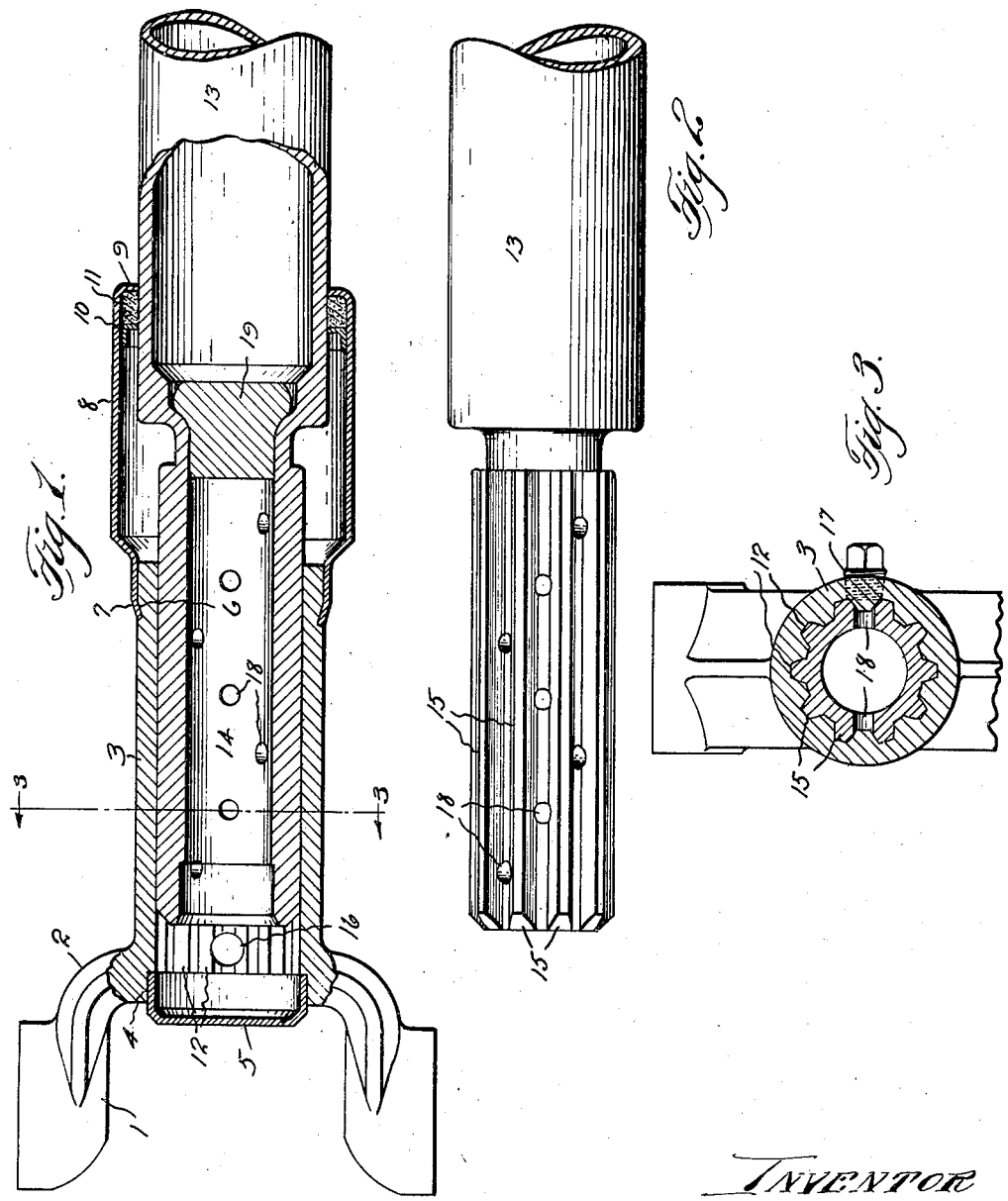

Patented June 9, 1925.

1,541,007

UNITED STATES PATENT OFFICE.

WILLIAM H. THIEMER, OF CLEVELAND, OHIO, ASSIGNOR TO HIMSELF, FREDERICK W. PETERS, AND J. H. WILLS, ALL OF CLEVELAND, OHIO.

SLIP-END SPLINE CONNECTION FOR UNIVERSAL JOINTS AND THE LIKE.

Application filed July 18, 1921. Serial No. 485,539.

*To all whom it may concern:*

Be it known that I, WILLIAM H. THIEMER, a citizen of the United States, residing at Cleveland, in the county of Cuyahoga and State of Ohio, have invented a certain new and useful Improvement in Slip-End Spline Connections for Universal Joints and the like, of which the following is a full, clear, and exact description, reference being had to the accompanying drawings.

This invention relates to universal joints, and more particularly to the slip-end spline connection between a hub for such joints and a cooperating shaft. The general purpose and object of the invention is to improve the construction of such connections and, as a result of such improvement, to secure the maximum possible driving contact surface between the cooperating ribs or projections on one of such members and the recesses or grooves in the other member, thereby insuring long life in such parts as well as making it possible to lubricate the same in the most efficient manner. A further object of the invention is to provide, for connections of this character, a construction which will enable the parts not only to be lubricated effectively, but to protect the same against access of dirt, dust and other injurious substances. I attain the foregoing objects and advantages in and through the construction and arrangement of parts illustrated in the drawing, wherein Fig. 1 represents a longitudinal sectional view through a hub and the cooperating end of the spline shaft of a universal joint, certain parts being shown in elevation; Fig. 2 a side elevation of one end of the spline shaft; and Fig. 3 a sectional detail corresponding to the line 3—3 of Fig. 1.

Describing the various parts by reference characters, 1 denotes the bearings and 2 the yoke arms of a universal joint, the said arms projecting from one end of an elongated hub 3. The parts 1 and 2 may be of any desired or standard construction, the arms 2 shown herein projecting from and formed integral with the adjacent end of the hub. This hub is formed at such end with an annular seat 4 for the reception of a cap 5 constituting an end closure. For convenience of reference the end of the hub which carrier the parts 1 and 2 will be referred to as the " front end " and the opposite end as the " rear end." Near its rear end and extending toward the same is a frusto-conical seat, indicated generally at 6, which seat is adapted to receive the correspondingly tapered front end 7 of a sheet metal housing 8. This housing is provided at its extreme rear end with an annular flange 9 which may contact with the body of the shaft (to be referred to hereinafter). Cooperating with the flange 9 is an annular ring 10, between which and said flange is inserted packing material 11.

The hub 3 is provided with a series of grooves 12 extending longitudinally thereof from the rear end. Ten such grooves are shown, although the number may be varied as desired, in accordance with the size of the shaft and hub and in accordance with variations in working conditions.

Slidably mounted within the hub 3 is the front end of the spline shaft 13. The shaft is preferably hollow and has its front end reduced in diameter, the enlarged rear portion being slidably engaged by the flange 9, the cooperating flange of the ring 10, and the packing 11. The front end 14 of the said shaft is provided with external longitudinal ribs 15 cooperating with the grooves 12. In cross section, the ribs 15 are each in the shape of an involute tooth, each preferably having a pressure angle of 20°, the grooves 12 being of corresponding contour. The broach for the grooves in the hub 3 is generated on the same contour as the ribs on the spline shaft.

By reason of the peculiar shape of the ribs and grooves, there will be complete contact between one side of each of the ten ribs and the cooperating side of each of the ten grooves, the sides of the teeth and of the grooves which are in contact depending upon the direction of the drive. In splines and hubs as ordinarily constructed, with ten ribs and ten grooves, only five of such ribs and grooves will be in actual contact while driving. With the arrangement shown and described herein, all ten of the ribs will engage their corresponding grooves. In the case of the ordinary ribs and grooves referred to, assuming that they are designed for a pressure of 1000 pounds per square inch of inch per length, because of the actual reduction in area of contact, the pressure will be two thousand pounds per square inch of inch per length. This will result in squeezing the oil from between the contacting surfaces, causing cutting and scoring of the ribs and grooves. By making the spline end connection in the manner shown herein, all of the ribs and grooves engage simultaneously and throughout the maximum theoretical contact area. Such being the case, the pressure for which the connection is designed will not be exceeded, and a film of oil will be preserved between the contacting surfaces of the relatively movable parts. Because of this reason, it is possible, with a minimum amount of labor in the matter of providing the ribs and grooves, to insure efficient lubrication and integrity of the interengaging parts.

For the purpose of effective lubrication of the said parts, the front end of the hub 3 is provided with a filling opening 16 provided with a screw plug 17 for closing the same. The front or reduced end 14 of the shaft is provided with apertures 18 extending therethrough and located between the ribs 15. The rear end of the part 14 of the said shaft is closed by means of a plug 19. With this arrangement, it will be evident that, by filling, to the requisite extent, the interior of the part 14 and the front of the hub 3 with lubricant, the lubricant will be forced outwardly through the holes 18 and between the ribs and grooves by the movements of the shaft and hub as well as by centrifugal action.

The openings 18 are, as indicated in Figs. 1 and 2, arranged preferably between the ribs 15, each groove or channel provided between two adjacent ribs being in communication with the chamber provided within said shaft.

The casing 8 catches any surplus lubricant that may escape through the openings 18 or that may be discharged between the ribs and grooves; and the packing arrangement provided by the parts 9, 10 and 11 avoids the waste of the lubricant and protects the same and the sliding parts against access of dust, grit, etc.

Having thus described my invention, what I claim is:

1. A slip-end spline connection comprising a hub having one end closed, a shaft slidably mounted in said hub, said hub and shaft having interengaging ribs and grooves, the portion of the shaft which cooperates with the hub being hollow to provide a lubricant receptacle with the closed end of the shaft and the said portion of the shaft being provided with apertures extending from the interior thereof outwardly between the ribs formed upon the outer surface thereof.

2. A slip-end spline connection comprising a hub having one end closed, a shaft slidably mounted in said hub, said hub and shaft having interengaging ribs and grooves, the portion of the shaft which cooperates with the hub being hollow to provide a lubricant receptacle with the closed end of the shaft and the said portion of the shaft being provided with apertures extending from the interior thereof outwardly to the outer surface thereof.

3. A slip-end spline connection comprising a hub provided with grooves extending longitudinally thereof, a shaft having a hollow end provided on its exterior surfaces with ribs cooperating with said grooves, the said shaft having openings extending from the interior thereof outwardly to the outer surface thereof, and a casing secured to and projecting beyond the open end of said hub, the said casing having at its outer end a packing ring slidably engaging the outer surface of said shaft.

4. A slip-end spline connection comprising a hub having one end closed and provided with grooves extending longitudinally thereof from its opposite open end, a shaft having a hollow end provided on its exterior surfaces with ribs cooperating with said grooves, and a casing secured to and projecting beyond the open end of said hub, the said casing having at its outer end a packing ring slidably engaging the outer surface of said shaft.

5. A slip-end spline connection comprising a hub closed at one end and provided with grooves extending longitudinally thereof, a shaft having a chamber at one end thereof, said end being slidably mounted in said hub and having ribs cooperating with said grooves, means for supplying lubricant to the space between the exterior of said shaft and the interior of said hub, and a casing secured at one end to the open end of the hub and having at its opposite end an inwardly directed annular flange, an annular collar within said sleeve and spaced from said flange, and packing material interposed between said collar and flange and adapted to engage said shaft.

In testimony whereof, I hereunto affix my signature.

WILLIAM H. THIEMER.